(12) United States Patent
Tsujii et al.

(10) Patent No.: US 9,488,468 B2
(45) Date of Patent: Nov. 8, 2016

(54) DISPLACEMENT SENSOR, SPECTRAL CHARACTERISTIC MEASURING APPARATUS, COLOR MEASURING APPARATUS, PLANAR MEASURED OBJECT QUALITY MONITORING APPARATUS, DISPLACEMENT MEASURING METHOD, SPECTRAL CHARACTERISTIC MEASURING METHOD, AND COLOR MEASURING METHOD

(71) Applicant: YOKOGAWA ELECTRIC CORPORATION, Musashino-shi, Tokyo (JP)

(72) Inventors: Atsushi Tsujii, Musashino (JP); Naomichi Chida, Musashino (JP); Kazufumi Nishida, Musashino (JP)

(73) Assignee: YOKOGAWA ELECTRIC CORPORATION, Tokyo (JP)

( * ) Notice: Subject to any disclaimer, the term of this patent is extended or adjusted under 35 U.S.C. 154(b) by 277 days.

(21) Appl. No.: 14/051,855

(22) Filed: Oct. 11, 2013

(65) Prior Publication Data
US 2014/0104623 A1  Apr. 17, 2014

(30) Foreign Application Priority Data
Oct. 12, 2012 (JP) ................................ 2012-227038

(51) Int. Cl.
*G01B 11/14* (2006.01)
*G01J 3/28* (2006.01)
(Continued)

(52) U.S. Cl.
CPC ............. *G01B 11/14* (2013.01); *G01B 11/026* (2013.01); *G01B 11/0608* (2013.01); *G01J 3/021* (2013.01);
(Continued)

(58) Field of Classification Search
CPC .......... G01J 3/0291; G01J 3/021; G01J 3/10; G01J 3/18; G01J 3/2803; G01J 3/42; G01J 3/0208; G01J 3/0216; G01J 3/027; G01J 3/50; G01J 3/0205; G01J 3/0229; G01J 3/26; G01J 3/32; G01J 3/501; G01J 3/524; G01J 3/502; G01J 3/46; G01J 3/462; G01J 3/465; G01J 3/28; G01J 3/51; G01J 3/513; G01J 2003/2866; G01J 2003/2873; G01B 11/026; G01B 11/14; G01B 11/0608; G01B 2210/50; G01N 21/8901; G01N 21/274
USPC ....... 356/614, 402, 300, 421, 333, 326–328, 356/447, 445, 475, 406, 405, 407, 236, 225, 356/229, 233, 320, 433, 435, 310, 432, 524, 356/526, 319; 250/205, 226
See application file for complete search history.

(56) References Cited

U.S. PATENT DOCUMENTS

| 5,457,539 | A | 10/1995 | Sturm | |
|---|---|---|---|---|
| 2002/0054292 | A1* | 5/2002 | Orelli | G01J 3/02 356/402 |

(Continued)

FOREIGN PATENT DOCUMENTS

| JP | 8-327455 A | 12/1996 |
|---|---|---|
| JP | 9-288007 A | 11/1997 |

(Continued)

*Primary Examiner* — Tarifur Chowdhury
*Assistant Examiner* — Sunghee Y Gray
(74) *Attorney, Agent, or Firm* — Sughrue Mion, PLLC

(57) ABSTRACT

A displacement sensor includes a light source unit configured to apply light with different plural wavelengths in a direction oblique to a measurement region of a planar measured object, a spectroscope configured to measure spectral distribution of light reflected by the measurement region, a feature amount extracting module configured to extract a feature amount of the spectral distribution, and a displacement calculating module configured to calculate displacement of the measurement region based on the extracted feature amount and a relation between displacement and a feature amount acquired previously.

9 Claims, 14 Drawing Sheets

(51) Int. Cl.
*G01N 21/55* (2014.01)
*G01N 21/25* (2006.01)
*G01J 1/04* (2006.01)
*G01J 1/42* (2006.01)
*G01J 3/42* (2006.01)
*G01J 3/02* (2006.01)
*G01J 3/10* (2006.01)
*G01J 3/18* (2006.01)
*G01B 11/02* (2006.01)
*G01B 11/06* (2006.01)
*G01J 3/50* (2006.01)

(52) U.S. Cl.
CPC .............. *G01J 3/027* (2013.01); *G01J 3/0208* (2013.01); *G01J 3/0216* (2013.01); *G01J 3/0291* (2013.01); *G01J 3/10* (2013.01); *G01J 3/18* (2013.01); *G01J 3/2803* (2013.01); *G01J 3/42* (2013.01); *G01J 3/50* (2013.01); *G01B 2210/50* (2013.01)

(56) References Cited

U.S. PATENT DOCUMENTS

2008/0297791 A1* 12/2008 Imura .................. G01J 3/28
356/306
2012/0206710 A1 8/2012 Niemelä et al.

FOREIGN PATENT DOCUMENTS

| JP | 2000-131243 A | 5/2000 |
| JP | 2001-21754 A | 1/2001 |
| JP | 2001-264173 A | 9/2001 |
| JP | 2005-337793 A | 12/2005 |
| JP | 2007-57529 A | 3/2007 |
| JP | 2007-101399 A | 4/2007 |
| JP | 2008-032590 A | 2/2008 |
| JP | 2010-281808 A | 12/2010 |
| WO | 2011/042606 A1 | 4/2011 |
| WO | 2011042606 A1 | 4/2011 |

* cited by examiner

DISPLACEMENT SENSOR, SPECTRAL CHARACTERISTIC MEASURING APPARATUS, COLOR MEASURING APPARATUS, PLANAR MEASURED OBJECT QUALITY MONITORING APPARATUS, DISPLACEMENT MEASURING METHOD, SPECTRAL CHARACTERISTIC MEASURING METHOD, AND COLOR MEASURING METHOD

CROSS-REFERENCE TO RELATED APPLICATION(S)

The present application claims the benefit of priority of Japanese Patent Application No. 2012-227038, filed on Oct. 12, 2012. The disclosures of the application are incorporated herein by reference.

BACKGROUND

1. Technical Field

The present disclosure relates to a displacement sensor using a spectroscope, a spectral characteristic measuring apparatus, a color measuring apparatus and a planar measured object quality monitoring apparatus to which the displacement sensor is applied, a displacement measuring method, a spectral characteristic measuring method, and a color measuring method.

2. Related Art

In a papermaking process, a film manufacturing process, etc., it is necessary to monitor a color of a manufactured object for quality management. For this purpose, a color measuring apparatus using a spectroscope is generally used. FIG. 12 is a diagram showing an external appearance of a planar measured object quality monitoring apparatus equipped with a color measuring apparatus using a spectroscope, and a case of measuring a color of paper to monitor quality of the paper will be described herein.

A planar measured object quality monitoring apparatus 600 includes a frame 610. Sheet-shaped paper 500 which is a measured object moves inside the frame 610 in a direction of arrow A by a roller (not shown) etc. An upper scanning head 620 for monitoring the paper 500 from the front side is movably attached to an upper side beam of the frame 610. A lower scanning head 630 for monitoring the paper 500 from the back side is movably attached to a lower side beam of the frame 610. The upper scanning head 620 and the lower scanning head 630 are constructed so as to reciprocate in a direction orthogonal to a paper movement direction in synchronization and monitor the same region from the front and the back.

A color measuring apparatus is mounted in, for example, the upper scanning head 620. Measurement points of the color measuring apparatus draw a locus as shown by a W-shaped line 501 by conveyance of the paper 500 and movement of the upper scanning head 620.

FIG. 13 is a diagram showing a structure of a color measuring apparatus using a spectroscope. As shown in FIG. 13, a color measuring apparatus 30 includes a barrel-shaped mirror 430 formed in a rotationally symmetrical shape. A measuring window 440 is installed in a portion, which faces the paper 500 that is the measured object, of the barrel-shaped mirror 430, so that dust or dirt is prevented from being got in. Light emitted in a xenon lamp 410 enters the barrel-shaped mirror 430 through a UV filter 420.

In order to obtain a stable measured result without being influenced by orientation characteristics of the measured object, it is important that the applied light should be rotationally symmetrical about a perpendicular of a measurement region M of the paper 500. Because of this, the measurement region M and the xenon lamp 410 which is a light source are arranged on the rotation axis of the barrel-shaped mirror 430.

The light reflected by the measurement region M is reflected by a mirror 450 installed on the rotation axis of the barrel-shaped mirror 430, and enters an optical fiber 320 through a collective lens 310. The reflected light guided to the optical fiber 320 is captured in a body of a spectroscope 300, and a luminous flux is limited by an entrance slit 330.

Thereafter, the light becomes parallel light by a parallel lens (an incoming side collimator lens) 340, and is applied to a diffraction device (a diffraction grating, a grating) 350. The light applied to the diffraction device 350 is reflected in a different direction according to a wavelength. When this light is collected by an integrating lens (an outgoing side collimator lens) 360, an image is formed in a different position every wavelength.

A line detector 370 constructed of plural photoelectric conversion elements arranged linearly is arranged in an image formation position, and detects intensity of light in each position. Since the position corresponds to a wavelength, spectral distribution which is intensity distribution every wavelength of the reflected light can be acquired based on a detected result of the line detector 370.

An operation module 400 controls measurement of the spectral distribution and also, converts the spectral distribution into an electrical signal to numerically process a color.

In the case of numerically processing the color, tristimulus values expressed by [Mathematical Formula 1] are widely used as a representation method of the color.

$$\begin{cases} X = k \sum_{400}^{700} S(\lambda)\bar{x}(\lambda)R(\lambda)\Delta\lambda \\ Y = k \sum_{400}^{700} S(\lambda)\bar{y}(\lambda)R(\lambda)\Delta\lambda \\ Z = k \sum_{400}^{700} S(\lambda)\bar{z}(\lambda)R(\lambda)\Delta\lambda \end{cases}$$ [Mathematical Formula 1]

Here, k is a fixed coefficient for defining an absolute value,

S(λ) is spectral distribution of a light source determined by standards, x(λ), y(λ) and z(λ) are spectral sensitivities called color matching functions determined by standards (where x represents an x bar, and the same applies to y and z), R(λ) is spectral reflectance of a measured object, and Δλ is a wavelength interval used at the time of computation.

In addition, λ changes in the range of wavelengths of visible light, and the range of wavelengths of visible light is set at 400 nm to 700 nm in [Mathematical Formula 1].

Since only R(λ) changes according to the measured object in [Mathematical Formula 1], measurement of the color is, that is, measurement of the spectral reflectance of the measured object. The spectral reflectance can be calculated based on spectral distribution obtained in measurement. The other parameters in [Mathematical Formula 1] are recorded on memory etc. in the operation module 400 and could be read out as necessary.

Since the spectral reflectance is a ratio of reflected light to irradiated light every wavelength, the quantity of the light irradiated toward the measurement region M becomes a standard when the spectral reflectance is calculated based on spectral distribution obtained in measurement. As a result, the quantity of the light irradiated toward the measurement region M is previously acquired using a standard whiteboard etc.

However, the barrel-shaped mirror 430 has characteristics in which the quantity of light changes by a distance from the measured object in an optical axis direction. As a result, in order to maintain the quantity of the light irradiated toward the measurement region M constant, a distance between the upper scanning head 620 and the paper 500 must be maintained constant, a beam length in which the upper scanning head 620 moves is generally as long as several meters to 10 meters or more, and it is difficult to maintain a horizontal position constant. Also, it is difficult to maintain a horizontal position of the paper 500 conveyed by a roller etc. constant.

Hence, in order to accurately measure the spectral reflectance, for example, it is proposed that a relation between a change in spectral reflectance and displacement from a reference position is previously examined, and in a case of actually measuring the spectral reflectance, displacement between the upper scanning head 620 and the paper 500 is measured and the measured spectral reflectance is corrected.

In this case, for example, the color measuring apparatus 30 and a coil 621 are mounted in the upper scanning head 620, and air bearings 631 and a soft magnetic substance 632 are mounted in the lower scanning head 630 as shown in FIG. 14. The paper 500 which is the measured object is constructed so that a distance from the lower scanning head 630 is maintained constant by the air bearings 631. Also, since a distance the coil 621 and the soft magnetic substance 632 can be measured using a principle of electromagnetic induction, a distance between the upper scanning head 620 and the lower scanning head 630 can be obtained. Accordingly, a distance between the upper scanning head 620 and the paper 500 is calculated and the displacement from the reference position can be obtained, so that the spectral reflectance can be corrected.

Or, it is proposed that a change in the quantity of light with respect to variations in distance is decreased by using a cylindrical mirror or a tubular polygon mirror instead of the barrel-shaped mirror 430 in which the quantity of light changes by the distance.

PRIOR ART REFERENCE

Patent Reference

[Patent Reference 1] JP-A-2010-281808
[Patent Reference 2] U.S. Pat. No. 5,457,539

However, since the former method requires new components such as the coil 621, the air bearings 631 and the soft magnetic substance 632 having no direct relation to spectral reflectance measurement, increases in size and cost of an apparatus are caused. Also, since the latter method requires a large-size mirror in order to decrease a change in the quantity of light with respect to large variations in distance, the increases in size and cost of the apparatus are caused.

As a result, if a displacement sensor for detecting displacement can be constructed using the spectroscope 300 essentially included by the related-art color measuring apparatus 30, high-accuracy measurement of spectral reflectance can be made without causing the increases in size and cost of the apparatus, and this is advantageous.

SUMMARY

Exemplary embodiments of the invention provide a displacement sensor using a spectroscope, a spectral characteristic measuring apparatus, a color measuring apparatus and a planar measured object quality monitoring apparatus to which the displacement sensor is applied, a displacement measuring method, a spectral characteristic measuring method, and a color measuring method.

A displacement sensor according to a first aspect of the invention, comprises:

a light source unit configured to apply light with different plural wavelengths in a direction oblique to a measurement region of a planar measured object;

a spectroscope configured to measure spectral distribution of light reflected by the measurement region;

a feature amount extracting module configured to extract a feature amount of the spectral distribution; and a displacement calculating module configured to calculate displacement of the measurement region based on the extracted feature amount and a relation between displacement and a feature amount acquired previously.

The light source unit may apply the light, whose wavelength changes according to an emission direction, in the direction oblique to the measurement region.

The light source unit may include a light source configured to emit light, and an optical element in which a transmission wavelength or a reflection wavelength changes according to an incidence angle or an incidence position.

The feature amount extracting module may extract a peak wavelength of the spectral distribution as a feature amount.

The light source unit may include a plurality of light sources with different wavelengths.

The feature amount extracting module may extract a ratio between intensities of wavelengths of respective light sources as a feature amount.

A spectral characteristic measuring apparatus according to a second aspect of the invention comprises:

a first light source unit configured to apply first light to a measurement region of a planar measured object;

a second light source unit configured to apply second light with different plural wavelengths in a direction oblique to the measurement region;

a spectroscope configured to measure a first spectral distribution of first light applied from the first light source and then reflected by the measurement region and a second spectral distribution of second light applied from the second light source and then reflected by the measurement region;

a feature amount extracting module configured to extract a feature amount of the second spectral distribution of the second light related to the second light source unit;

a spectral characteristic calculating module configured to calculate spectral characteristics based on the first spectral distribution of the first light related to the first light source unit; and a spectral characteristic correcting module configured to correct the spectral characteristics based on the extracted feature amount and a relation between spectral characteristics and a feature amount acquired previously.

The second light source unit may apply the light, whose wavelength changes according to an emission direction, in the direction oblique to the measurement region.

The second light source unit may include a light source configured to emit light, and an optical element in which a transmission wavelength or a reflection wavelength changes according to an incidence angle or an incidence position.

A wavelength range of emission by the first light source unit may do not overlap with a wavelength range of emission by the second light source unit.

The second light source unit may include a plurality of light sources with different wavelengths.

A color measuring apparatus according to a third aspect of the invention comprises:

a spectral characteristic measuring apparatus in which the spectral characteristic is spectral reflectance; and a color operating module configured to measure a color of the measurement region based on the corrected spectral reflectance.

The second light source unit may apply the light, whose wavelength changes according to an emission direction, in the direction oblique to the measurement region.

The second light source unit may include a plurality light sources with different wavelengths.

A planar measured object quality monitoring apparatus according to a fourth aspect of the invention, comprises:

a scanning head; and a color measuring apparatus mounted in the scanning head.

A displacement measuring method according to a fifth aspect of the invention comprises:

applying light with different wavelengths in a direction oblique to a measurement region of a planar measured object;

measuring spectral distribution of light reflected by the measurement region;

extracting a feature amount of the spectral distribution; and calculating displacement of the measurement region based on the extracted feature amount and a relation between displacement and a feature amount acquired previously.

A spectral characteristic measuring method according to a sixth aspect of the invention comprises:

applying first light to a measurement region of a planar measured object;

measuring spectral characteristics based on spectral distribution of the first light reflected by the measurement region;

applying second light with different wavelengths in a direction oblique to the measurement region;

extracting a feature amount of spectral distribution of the second light reflected by the measurement region; and correcting the measured spectral characteristics based on the extracted feature amount and a relation between spectral characteristics and a feature amount acquired previously.

A color measuring method according to a seventh aspect of the invention comprises:

applying first light to a measurement region of a planar measured object;

calculating spectral reflectance based on spectral distribution of the first light reflected by the measurement region;

applying second light with different wavelengths in a direction oblique to the measurement region;

extracting a feature amount of spectral distribution of the second light reflected by the measurement region;

correcting the calculated spectral reflectance based on the extracted feature amount and a relation between spectral reflectance and a feature amount acquired previously; and measuring a color of the measurement region based on the corrected spectral reflectance.

According to the exemplary embodiments of the invention, it is possible to provide a displacement sensor using a spectroscope, a spectral characteristic measuring apparatus, a color measuring apparatus and a planar measured object quality monitoring apparatus to which the displacement sensor is applied, a displacement measuring method, a spectral characteristic measuring method, and a color measuring method.

DETAILED DESCRIPTION

Figure 1:
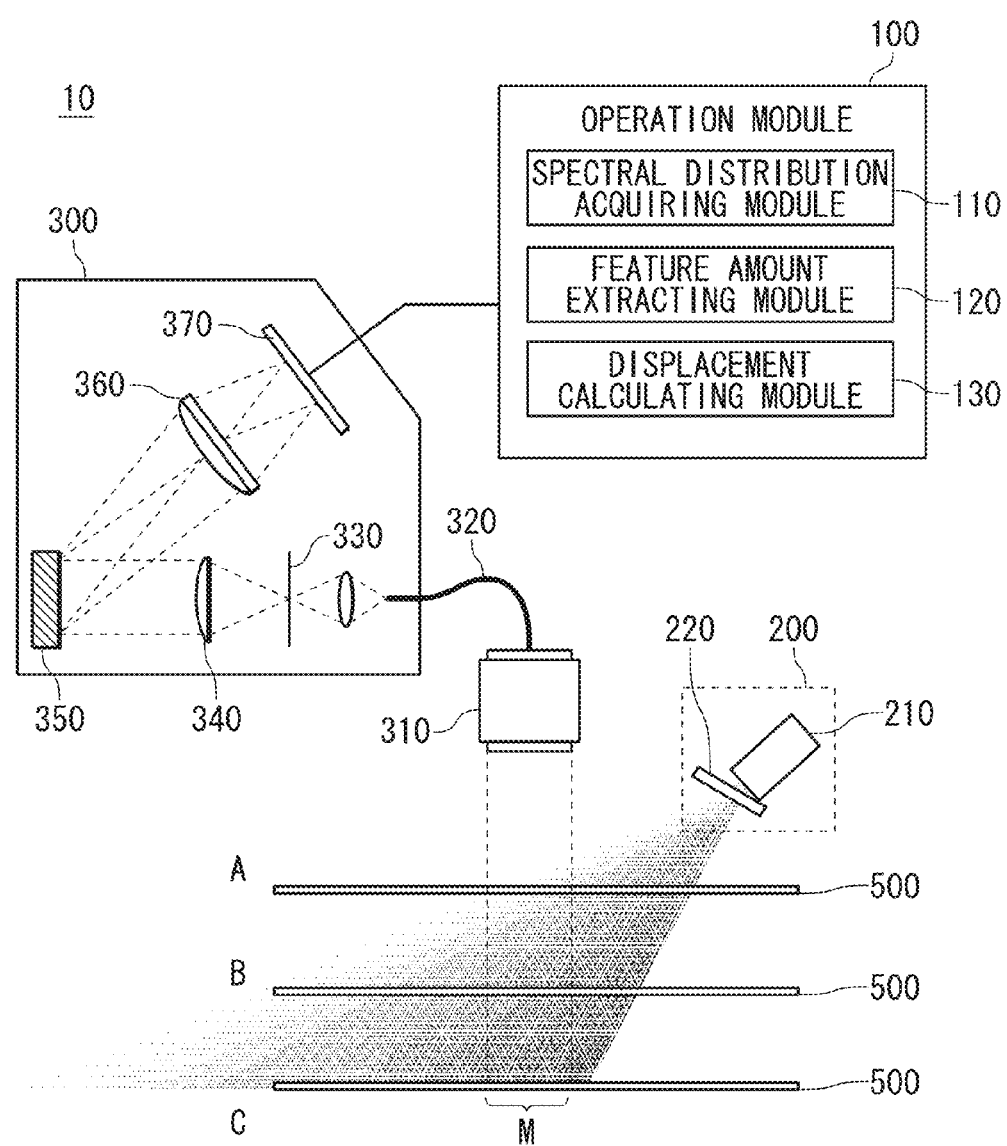
FIG. 1 is a diagram describing a displacement sensor using a spectroscope according to a first exemplary embodiment of the invention.

Exemplary embodiments of the invention will be described with reference to the drawings. FIG. 1 is a diagram describing a displacement sensor according to a first embodiment. As shown in FIG. 1, a displacement sensor 10 is an apparatus for measuring displacement of a measured object using a spectroscope, and includes an operation module 100, a light source unit 200 and a spectroscope 300.

In the first embodiment, a paper 500 as the measured object will be described, but the displacement sensor 10 is suitable to measure displacement of a film or other planar objects. As long as the measured object is the planar object, the measured object is not limited to continuous objects and the embodiment can be applied to measurement of displacement of a small piece or a portion of the apparatus.

In the displacement sensor 10, a region with a desired size in the planar measured object is targeted for measurement of displacement and this region is called a measurement region M. Since a region having a certain level of size rather than one point of a pinpoint like laser measurement is targeted for measurement, the displacement sensor 10 is suitable for use in measurement of average displacement of a desired region. Also, displacement of, for example, paper, in which in laser measurement, accurate measurement cannot be made due to the so-called submarining, can be measured with high accuracy.

The spectroscope 300 has a configuration similar to a related-art configuration. That is, an entrance slit 330, a parallel lens 340, a diffraction device 350, an integrating lens 360 and a line detector 370 are included in a body, and a collective lens 310 is connected through an optical fiber 320. Of course, the configuration is not limited to this configuration, and spectroscopes having other configurations may be used.

The light source unit 200 includes a light source 210 and an optical element 220, and emits light whose wavelength changes according to an emission direction. The light source unit 200 is installed so that the emitted light is obliquely applied to a surface including the measurement region M of the paper 500.

In the first embodiment, a light emitting diode for emitting diffused light with a wavelength of a predetermined range, for example, the range of 800 nm to 900 nm is used as the light source 210. Also, an optical filter using a dielectric multilayer film, for example, a band-pass filter is used as the optical element 220. The light source unit 200 is constructed so that light emitted from the light emitting diode obliquely enters the optical filter.

Since the optical filter using the dielectric multilayer film utilizes the fact that light transmission characteristics change by interference of reflection occurring at the interface of each layer, the optical filter exhibits characteristics in which a wavelength of transmitted light differs according to an incidence angle when light is caused to obliquely enter. Among the optical filters, the band-pass filter using the dielectric multilayer film is constructed so as to transmit only a specific wavelength when light is caused to vertically enter, but the embodiment is constructed so as to cause light to obliquely enter intentionally in order to generate light whose wavelength changes according to an emission direction.

Figure 2:
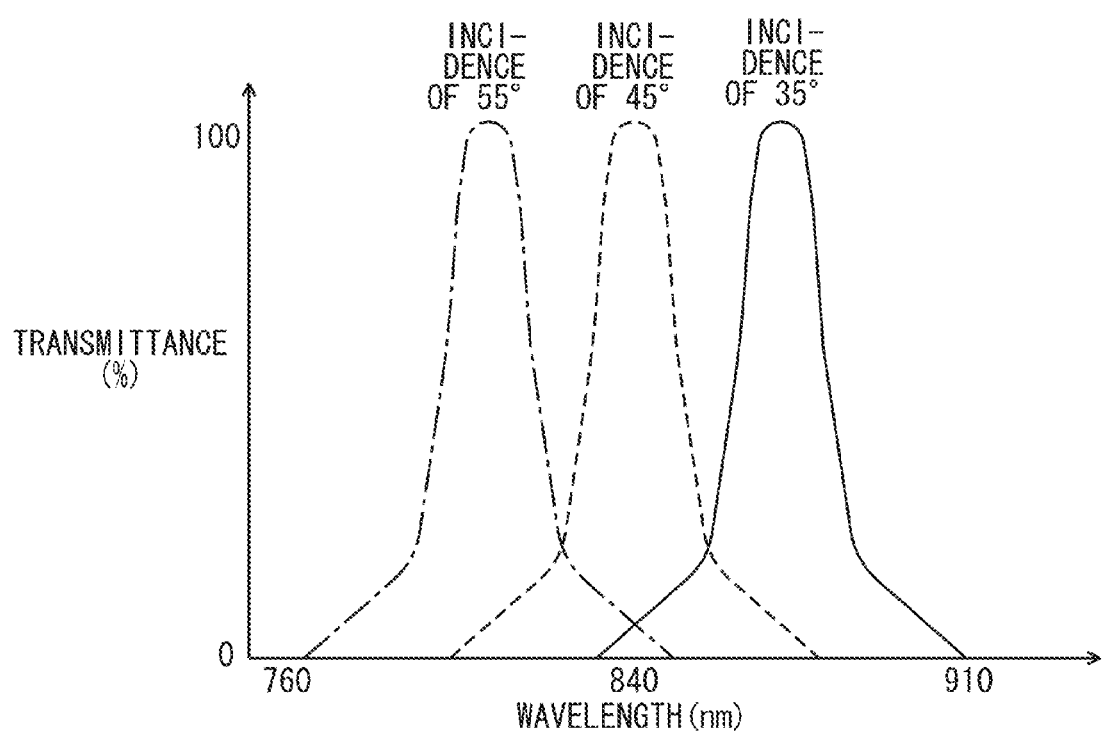
FIG. 2 is a diagram describing characteristics in which a wavelength of transmitted light differs according to an incidence angle.

FIG. 2 is a diagram describing characteristics in which a wavelength of transmitted light differs according to an incidence angle. FIG. 2 is a diagram showing transmittances of the optical filter when the incidence angles of light are set at 55°, 45° and 35°. It is apparent from FIG. 2 that it is easy to transmit light of 810 nm at the incidence angle of 55° and it is easy to transmit light of 840 nm at the incidence angle of 45° and it is easy to transmit light of 870 nm at the incidence angle of 35°.

By obliquely applying light with a wavelength of a predetermined range to such an optical filter, light whose wavelength continuously changes according to an emission direction is emitted from the light source unit 200 as shown in FIG. 1. Here, the light shall have distribution in which the wavelengths become long in the left to right directions in FIG. 1.

Since the light emitted from the light source unit 200 is obliquely applied to a surface including the measurement region M of the paper 500, spectral distribution of light reflected by the measurement region M changes according to displacement of the paper 500.

Figure 3:
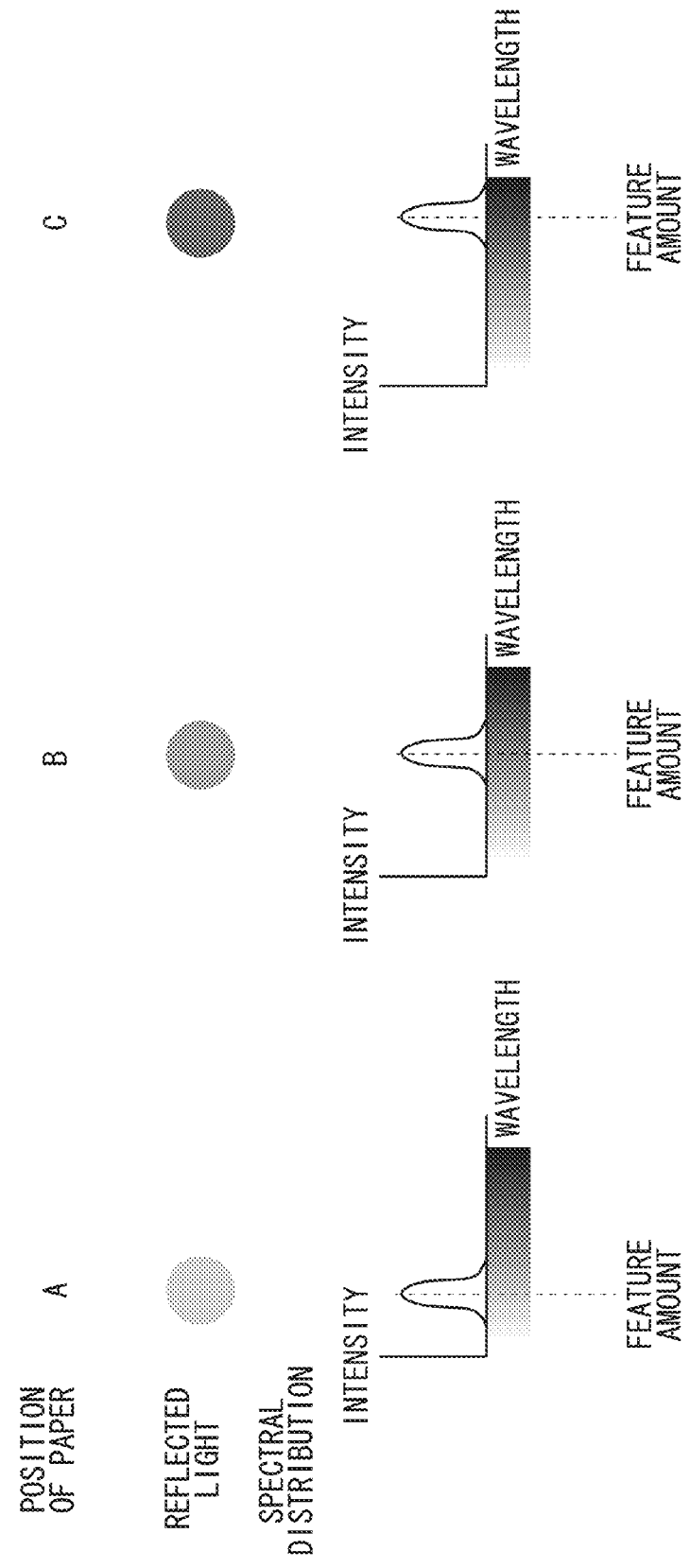
FIG. 3 is a diagram describing spectral distribution and feature amount with respect to the respective displacements.

For example, in a position A near to the light source unit 200, spectral distribution having high intensity of light with a short wavelength is obtained as shown in FIG. 3. As a distance from the light source unit 200 is longer in a position B and a position C, spectral distribution having high intensity of light with a long wavelength is obtained.

Since this spectral distribution corresponds to displacement, when a relation between the displacement and the spectral distribution is previously associated, the spectroscope 300 can measure the spectral distribution of the measurement region M to measure the displacement of the paper 500 based on the obtained spectral distribution.

In order to perform this processing, the operation module 100 includes a spectral distribution acquiring module 110, a feature amount extracting module 120 and a displacement calculating module 130.

The spectral distribution acquiring module 110 acquires spectral distribution of the measurement region M measured by the spectroscope 300.

The feature amount extracting module 120 acquires a feature amount from the acquired spectral distribution. In the first embodiment, a peak frequency of the spectral distribution is used as the feature amount as shown in FIG. 3. However, the feature amount is not limited to the peak frequency. For example, an average wavelength or an intermediate wavelength in the range of distribution may be used as the feature amount. In addition, by properly setting a wavelength range of the light source 210, the peak frequency of the spectral distribution can avoid being influenced by a color of the paper 500 itself, but the spectral distribution may be corrected according to a color of the paper 500 measured separately.

A correspondence relation between displacement and a feature amount acquired previously is stored in the displacement calculating module 130. The correspondence relation may use a function form or a table form. Based on this correspondence relation, displacement of the measurement region M can be calculated from the feature amount extracted by the feature amount extracting module 120.

In addition, the optical filter of the dielectric multilayer film is used as the optical element 220 of the light source unit 200, but it may be constructed so as to emit light whose wavelength changes according to an emission direction using other optical elements. For example, a prism made of glass having desired dispersion or a diffraction grating (a grating) may be used. A colored glass filter or a filter in which a transmission wavelength changes according to a place may be used. In these optical elements, the transmission wavelength changes according to an angle. In brief, any optical elements in which a transmission wavelength or a reflection wavelength changes according to an incidence angle or an incidence position may be used.

According to the first embodiment as described above, the displacement sensor 10 can be constructed using the spectroscope 300. The displacement sensor 10 using the spectroscope 300 can suitably be used in a measuring apparatus in order to improve measurement accuracy by performing correction based on displacement, and can be applied to, for example, a color measuring apparatus, a whiteness measuring apparatus, a glossiness measuring apparatus, a moisture meter or a basis weight meter.

Next, a second embodiment in which the displacement sensor 10 of the first embodiment described above is applied to a color measuring apparatus will be described. The invention is not limited to the color measuring apparatus, and can be widely applied to a spectral characteristic measuring apparatus. The color measuring apparatus of the second embodiment corrects spectral reflectance measured by using a spectroscope using a measured result of the displacement sensor using the spectroscope. Then, color measurement is operated using the corrected spectral reflectance. However, it may be constructed so as to calculate the spectral reflectance by correcting spectral distribution using the measured result of the displacement sensor.

Figure 4:
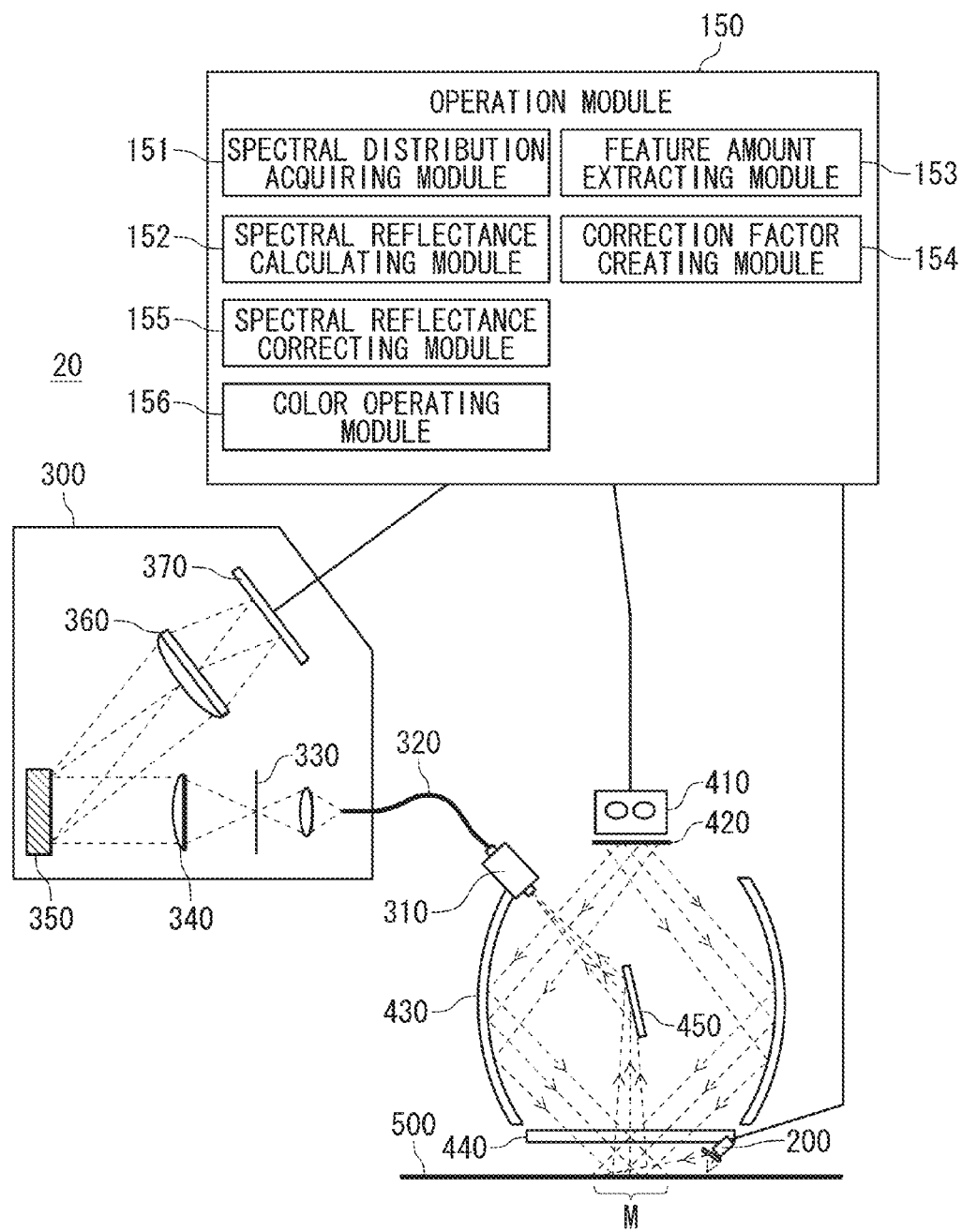
FIG. 4 is a diagram showing a configuration of a color measuring apparatus according to a second exemplary embodiment of the invention.

FIG. 4 is a diagram showing a configuration of the color measuring apparatus according to the present embodiment. As shown in FIG. 4, like the related-art color measuring apparatus 30, a color measuring apparatus 20 for measuring a color of a measurement region M of paper 500 which is a measured object includes a spectroscope 300, a barrel-shaped mirror 430 and a related optical system. The color measuring apparatus 20 further includes a light source unit 200 in the bottom of the barrel-shaped mirror 430. The measured object is not limited to the paper 500, and as long as the measured object is a planar object, the measured object may be a continuous object such as a film. The color measuring apparatus can also be used in color measurement of a printed object or a painted surface.

The light source unit 200 is similar to the light source unit 200 in the displacement sensor 10 described above, and applies light whose wavelength changes according to an emission direction in a direction oblique to a surface including the measurement region M of the paper 500.

Like the related-art color measuring apparatus 30, light emitted from a xenon lamp 410 and then reflected by the measurement region M enters an optical fiber 320 through a collective lens 310. The reflected light guided to the optical fiber 320 is captured in a body of the spectroscope 300, and spectral distribution is detected by a line detector 370. Here, the light is visible light in which a wavelength range of the xenon lamp 410 is, for example, 400 nm to 700 nm.

Also, light emitted from the light source unit 200 and then reflected by the measurement region M enters the optical fiber 320 through the collective lens 310. The reflected light guided to the optical fiber 320 is captured in the body of the spectroscope 300, and spectral distribution is detected by the line detector 370. Here, the light is infrared light in which a wavelength range of the light source unit 200 is, for example, 800 nm to 900 nm.

That is, since both of the reflected light from the measurement region M of light for color measurement by the xenon lamp 410 and the reflected light from the measurement region M of light for displacement measurement by the light source unit 200 are collected by the collective lens 310 and are captured in the body of the spectroscope 300, spectral distribution with different wavelength ranges in the same measurement region M can simultaneously be measured by one spectroscope 300. As a result, the spectroscope capable of making measurement in the range of 400 nm to 900 nm is used as the spectroscope 300.

As shown in FIG. 4, the color measuring apparatus 20 includes an operation module 150. The operation module 150 includes a spectral distribution acquiring module 151, a spectral reflectance calculating module 152, a feature amount extracting module 153, a correction factor creating module 154, a spectral reflectance correcting module 155 and a color operating module 156.

The spectral distribution acquiring module 151 acquires spectral distribution measured by the spectroscope 300. The spectral distribution includes spectral distribution for color measurement of 400 nm to 700 nm and spectral distribution for displacement measurement of 800 nm to 900 nm. The spectral distribution for color measurement is hereinafter called spectral distribution for measurement. The spectral distribution for displacement measurement is hereinafter called spectral distribution for correction since the spectral distribution for displacement measurement of 800 nm to 900 nm is used for correction of spectral distribution for color measurement.

The spectral reflectance calculating module 152 calculates spectral reflectance from the spectral distribution for measurement acquired by the spectral distribution acquiring module 151. The spectral reflectance can be calculated using known spectral reflectance of a standard whiteboard and spectral distribution measured previously using a standard whiteboard at a reference point.

Figure 6:
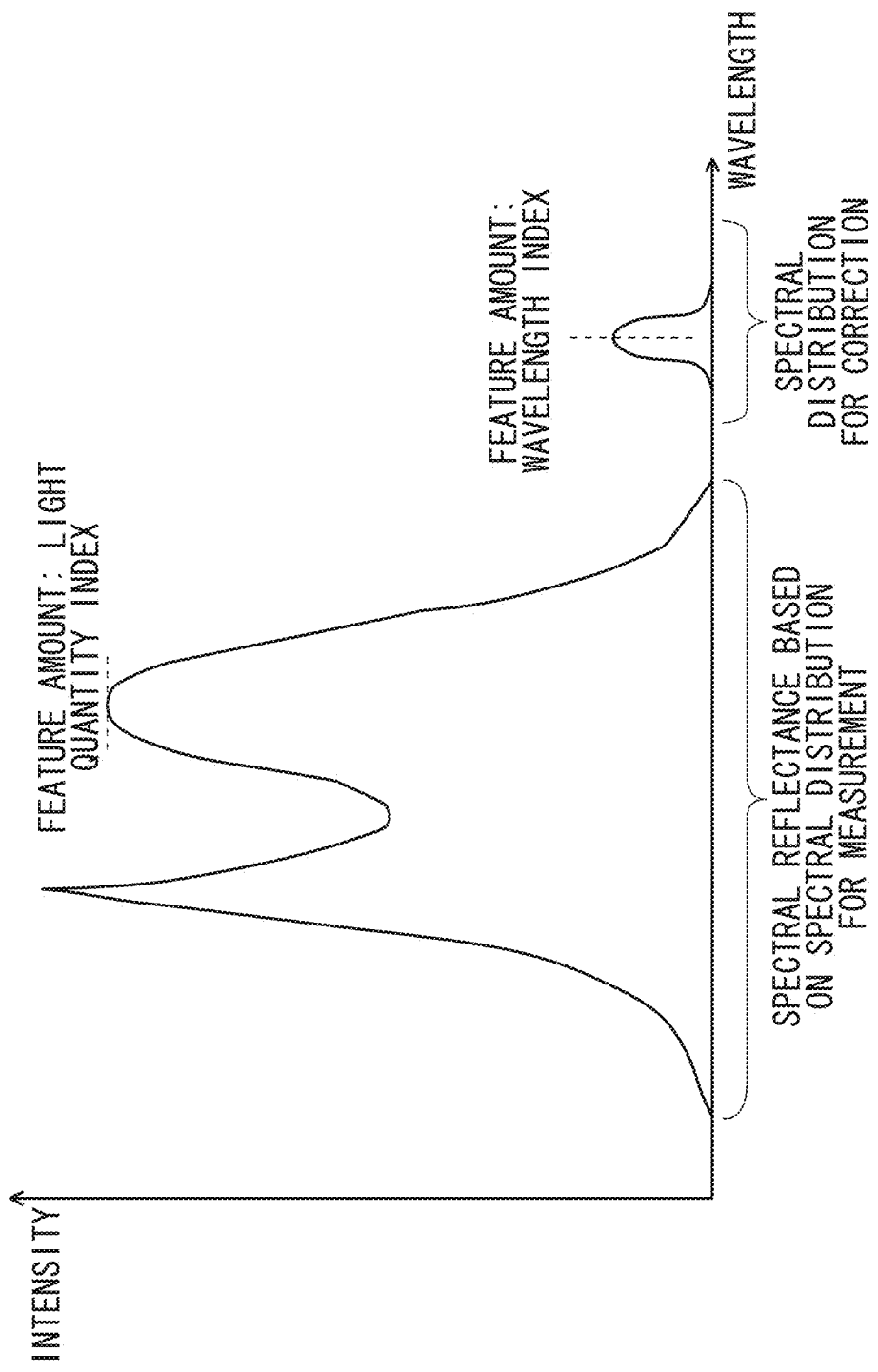
FIG. 6 is a diagram describing feature amounts of spectral distribution.

The feature amount extracting module 153 extracts a feature amount of the spectral distribution for correction. As shown in FIG. 6, the feature amount of the spectral distribution for correction is a wavelength index corresponding to a wavelength, and can be used as, for example, a peak frequency. Or, an approximate expression of spectral intensity near to the peak may be obtained to use a wavelength of its vertex as a wavelength index.

Also, the feature amount extracting module 153 extracts a feature amount of spectral reflectance based on the spectral distribution for measurement at the time of creating a correction factor. The feature amount of spectral reflectance is a light quantity index corresponding to a light quantity, and can be used as, for example, a peak value within the wavelength range for measurement. Or, an approximate expression of spectral reflectance near to the peak may be obtained to use its vertex as a light quantity index or use an average value of spectral reflectance as a light quantity index.

The correction factor creating module 154 creates a correction function for correcting the measured spectral reflectance, and calculates a correction factor based on the correction function, and corrects the measured spectral reflectance. The correction function is created before actual color measurement. A procedure for creating the correction function will be described below.

The spectral reflectance correcting module 155 corrects spectral reflectance using a correction factor corresponding to spectral distribution for correction measured in actual color measurement. Accordingly, correction of spectral reflectance according to displacement of the paper 500 is made.

The color operating module 156 performs color operation of the measurement region M using the corrected spectral reflectance, and outputs the color operation as a measured result.

Figure 5:
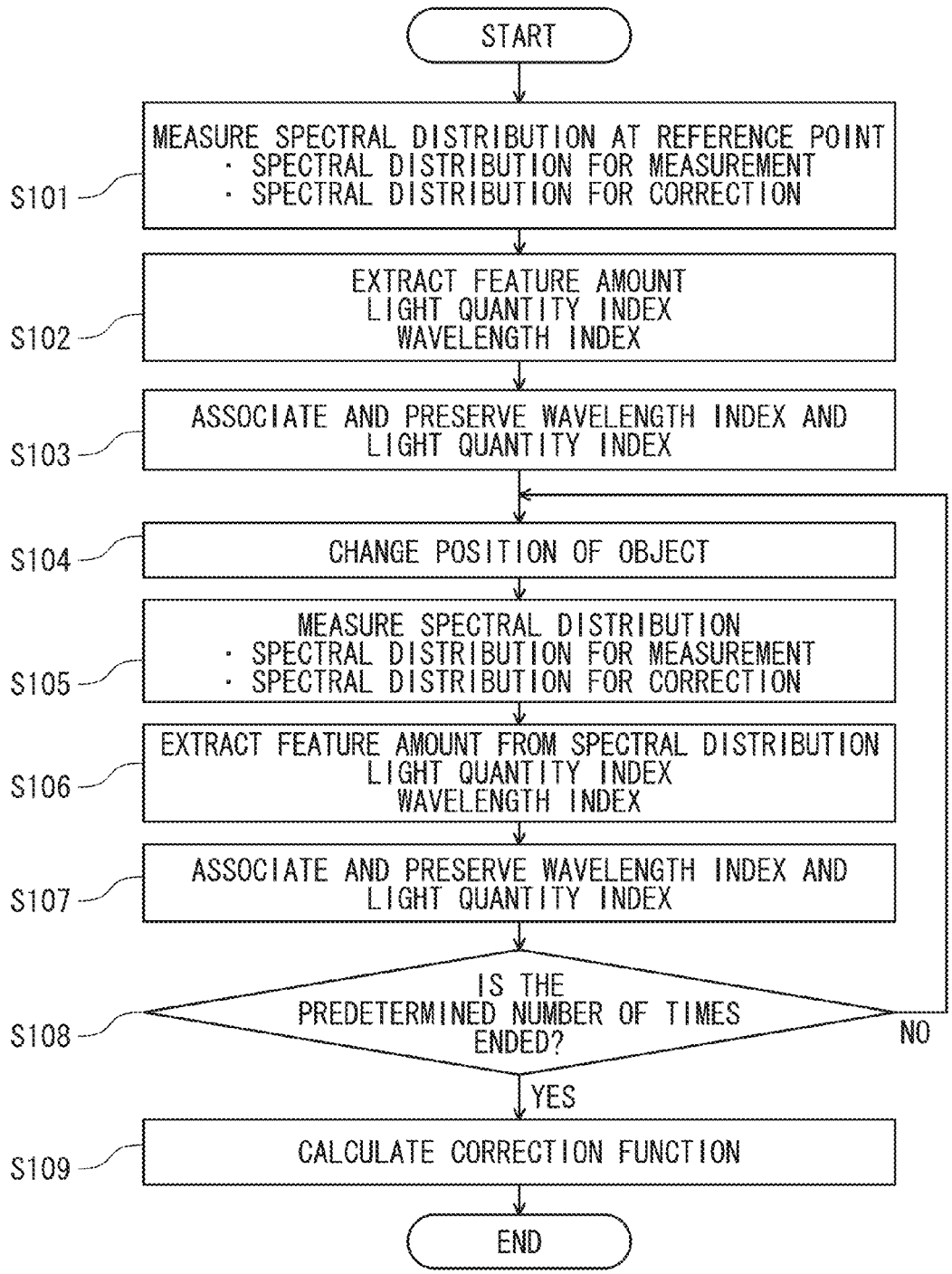
FIG. 5 is a flowchart describing a procedure for creating a correction function.

Next, the procedure for creating the correction function used in the case of correcting spectral reflectance will be described with reference to a flowchart of FIG. 5. This processing is performed by control of the correction factor creating module 154.

First, the spectral distribution acquiring module 151 acquires spectral distribution of a measured object at a reference point (S101). It is unnecessary that the measured object should be the paper 500 used in actual measurement. The reference point becomes a reference point of displacement, and spectral reflectance at the reference point becomes the criterion for a correction factor.

Then, the feature amount extracting module 153 extracts a feature amount from the spectral distribution acquired at the reference point (S102). Concretely, as shown in FIG. 6, for spectral distribution for measurement of 400 nm to 700 nm, spectral reflectance is calculated to extract a light quantity index, and for spectral distribution for correction of 800 nm to 900 nm, a wavelength index is extracted. When feature amounts of the light quantity index and the wavelength index are extracted, the wavelength index and the light quantity index are associated and preserved (S103).

Then, a position of the measured object in an optical axis direction is changed (S104). A changed distance is freely selected, and it is unnecessary to acquire the amount of displacement. Then, in the changed position, the spectral distribution acquiring module 151 acquires spectral distribution (S105), and the feature amount extracting module 153 extracts a feature amount from the acquired spectral distribution (S106). Here too, for spectral distribution for measurement of 400 nm to 700 nm, a light quantity index is extracted from spectral reflectance, and for spectral distribution for correction of 800 nm to 900 nm, a wavelength index is extracted.

Figure 7:
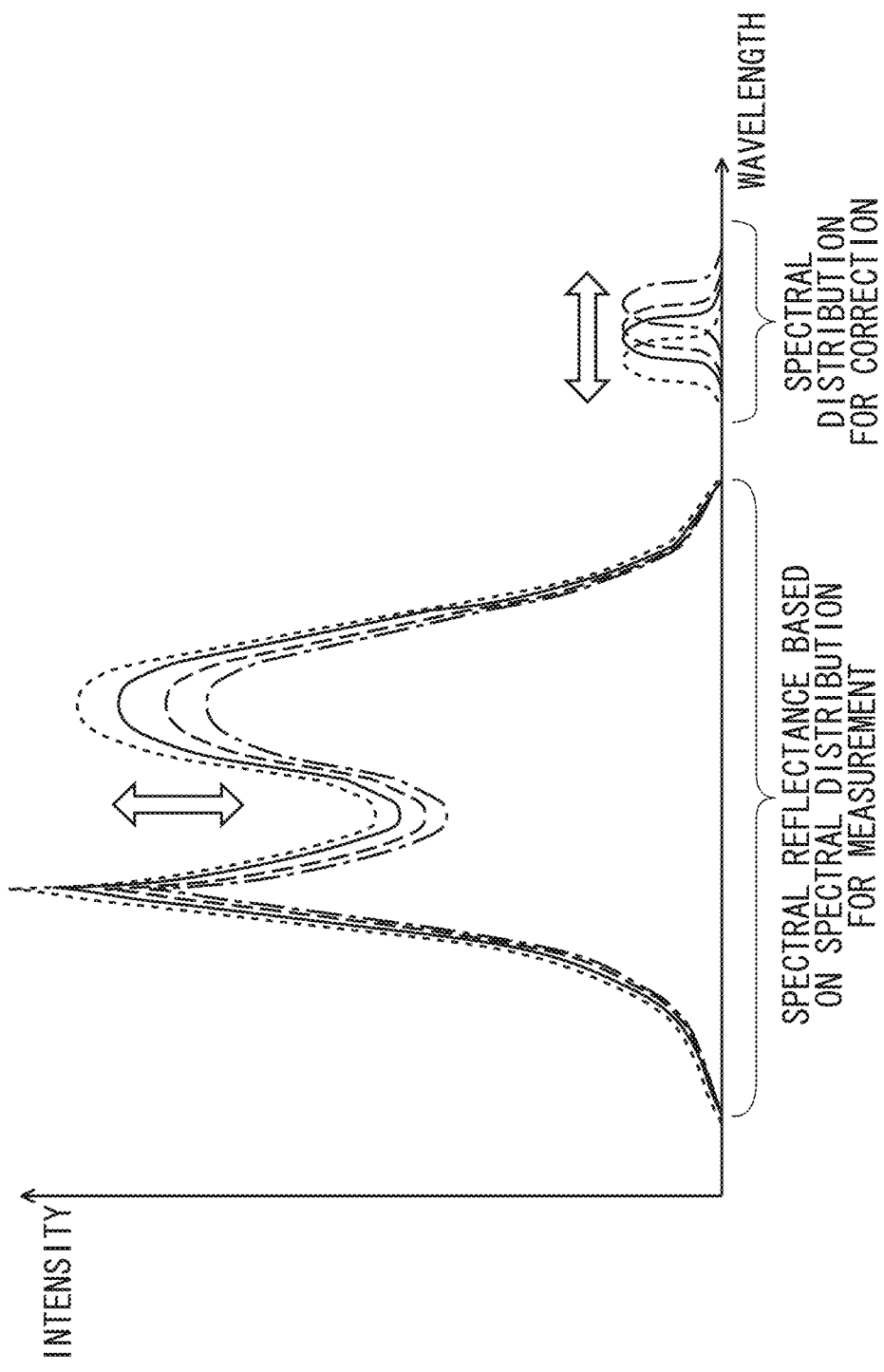
FIG. 7 is a diagram describing change of distance and change of the feature amount.

When the position of the measured object in the optical axis direction is changed, a value of spectral reflectance is changed for spectral distribution for measurement and a wavelength is changed for spectral distribution for correction as shown in FIG. 7. Then, a change in the value of spectral reflectance and a change in the wavelength of spectral distribution for correction have a correlation since both of the changes correspond to the amount of displacement.

When feature amounts of the light quantity index and the wavelength index are extracted, the wavelength index and the light quantity index are associated and preserved (S107). The processing (S104 to S107) for changing the position of the measured object in the optical axis direction and acquiring the spectral distribution and preserving the feature amounts is repeated by the predetermined number of times (S108) and when the predetermined number of times is ended, the correction factor creating module 154 calculates a correction function (S109).

The correction function can be calculated, for example, by plotting a correspondence relation between the wavelength index and the light quantity index at the time of changing the position of the measured object in the optical axis direction based on a correspondence between the wavelength index and the light quantity index at the reference point and approximating the correspondence relation by a polynomial.

Figure 8:
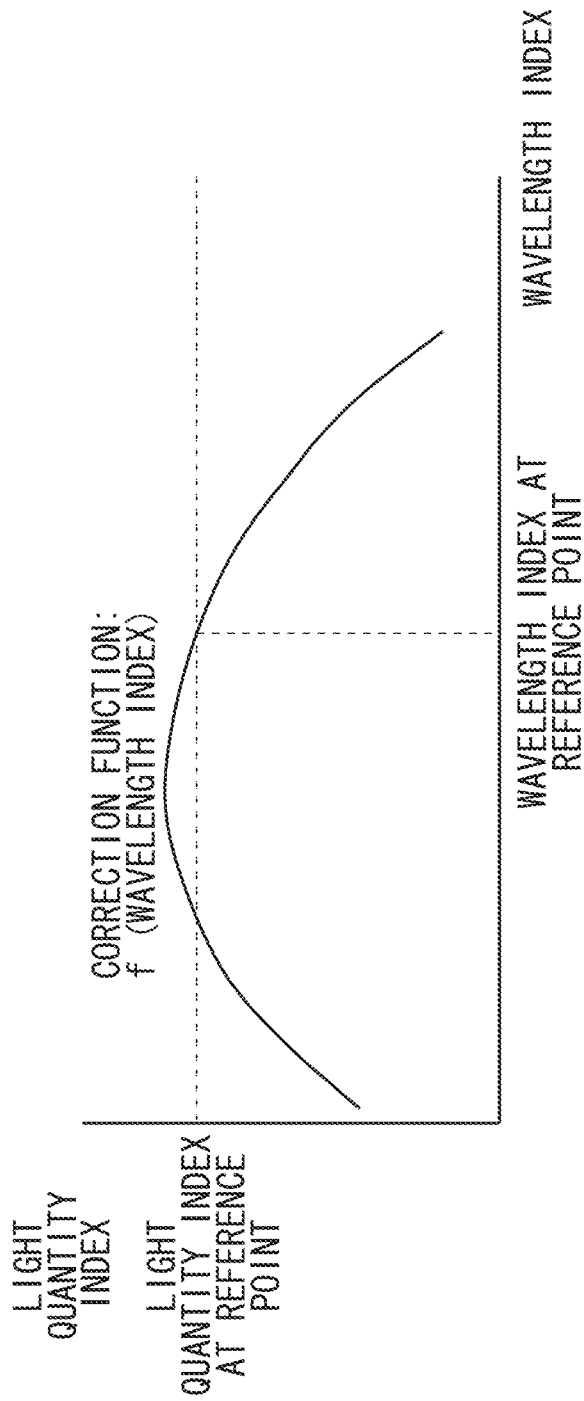
FIG. 8 is a diagram describing correspondence relation between a wavelength index and a light quantity index.

For example, when the correspondence relation between the wavelength index and the light quantity index is plotted and a line as shown in FIG. 8 is obtained, the light quantity index at the reference point is set at 1 and a function in which this line is approximated by a polynomial is set at a correction function f (wavelength index). By using the correction function f (wavelength index), variations in spectral reflectance based on a change in the light quantity by displacement can be corrected based on the wavelength index.

Figure 9:
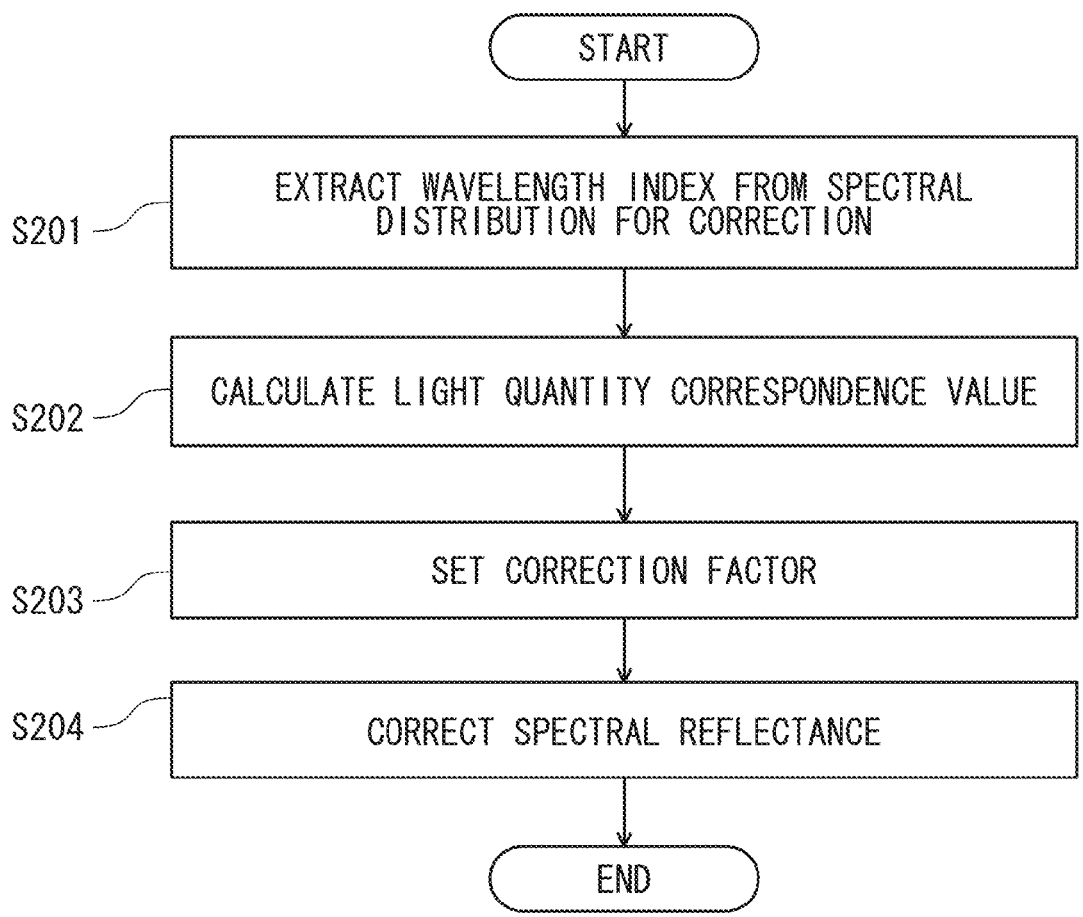
FIG. 9 is a flowchart describing procedure of correction of spectral distribution at measurement.

In the case of actual measurement, spectral reflectance obtained by measurement is corrected according to a flowchart shown in FIG. 9.

The feature amount extracting module 153 extracts a wavelength index from spectral distribution for correction obtained by measurement (S201), and the correction factor creating module 154 calculates a light quantity correspondence value corresponding to the extracted wavelength index based on the correction function f (wavelength index) (S202). Then, the reciprocal of the light quantity correspondence value is set at a correction factor (S203).

The spectral reflectance correcting module 155 corrects spectral reflectance obtained by measurement using this correction factor (S204). Accordingly, the spectral reflectance in which displacement to the reference point is corrected can be obtained, and color operation of the measurement region M using the spectral reflectance of the measurement region M can be performed with high accuracy.

In addition, in the second embodiment described above, the wavelength range of spectral distribution for measurement is set at 400 nm to 700 nm and the wavelength range of spectral distribution for correction is set at 800 nm to 900 nm and the wavelength ranges of both light sources are varied, but the wavelength range of spectral distribution for correction may be overlapped with the wavelength range of spectral distribution for measurement. For example, the wavelength range of spectral distribution for correction may be set at 500 nm to 600 nm. In this case, the xenon lamp 410 for measurement and the light source 210 of the light source unit 200 for correction are alternately turned on, and spectral distribution for measurement and spectral distribution for correction are alternately acquired. In this configuration, the spectroscope 300 could be the spectroscope capable of making measurement in the range of 400 nm to 700 nm.

According to the second embodiment as described above, the color measuring apparatus 30 can be constructed by using the displacement sensor 10 using the spectroscope 300. As a result, correction of spectral reflectance based on displacement can be made by a simple configuration, so that the high-accuracy color measuring apparatus can be implemented without causing the increases in size and cost.

The embodiment of applying the displacement sensor to the color measuring apparatus has been described above since the importance of the color measuring apparatus has been recently increasing. The reason why the importance of the color measuring apparatus is increasing includes, for example, the importance of quality management of paper as a base increases since quality of printing improves, and it is necessary to manage opacity as before in order to prevent bleed-through although pulp usage is decreased for resource saving and the color measuring apparatus is indispensable for such management.

Also, deforestation is strictly limited according to global environmental conservation, and demand for recycled paper is increasing and also quality requirements for the recycled paper are increasing. For example, there is a need to obtain a color comparable to that in the case of using virgin pulp, and the color measuring apparatus is required in order to meet this need.

Further, in media such as newspapers or magazines with printing of only black in related art, color printing becomes widespread, or added value or quality of packaging materials such as colored cardboard or patterned cardboard is increasing and quality management by the color measuring apparatus is widely exercised. For the above reasons, the importance of the color measuring apparatus is increasing.

Figure 12:
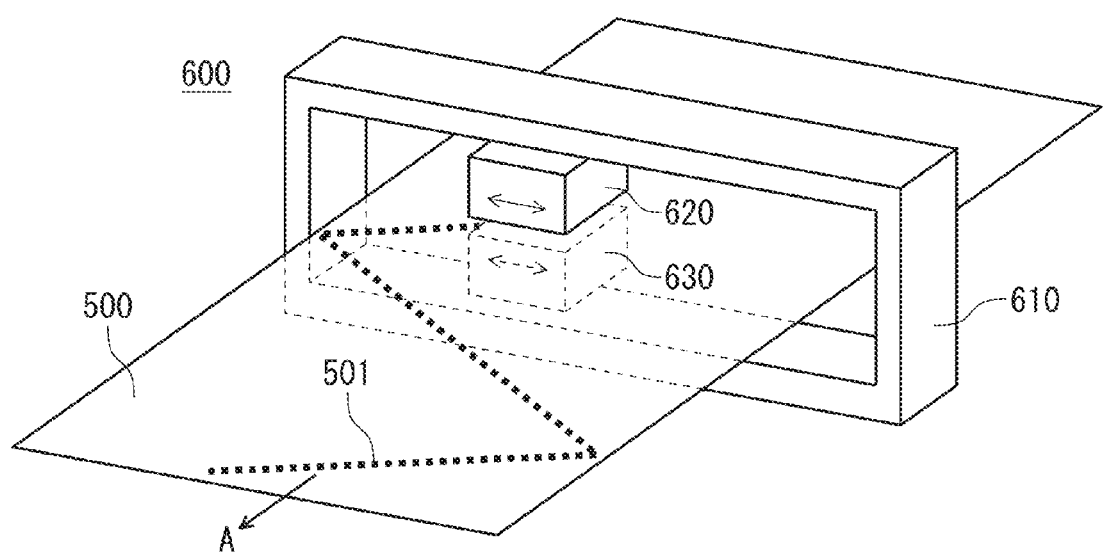
FIG. 12 is a diagram showing an external appearance of a planar measured object quality monitoring apparatus equipped with a color measuring apparatus using a spectroscope.
Figure 13:
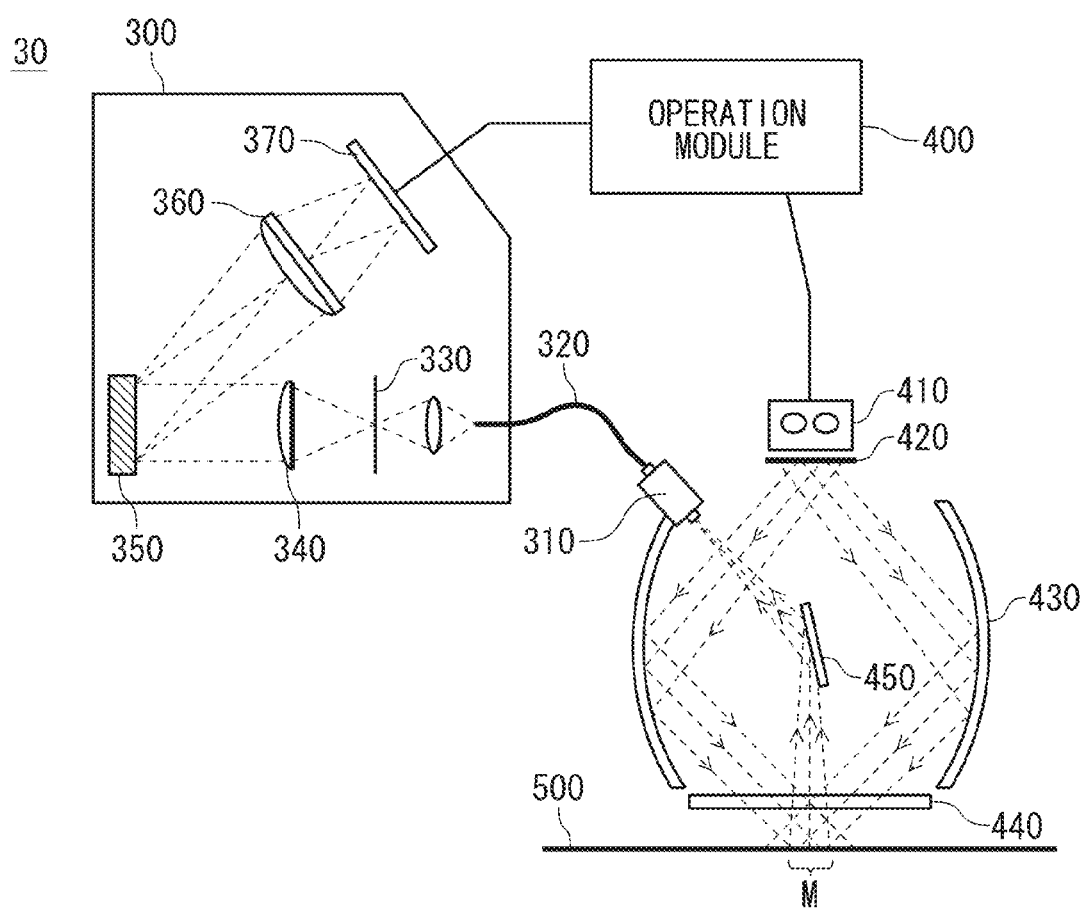
FIG. 13 is a diagram showing a structure of the color measuring apparatus using the spectroscope.
Figure 14:
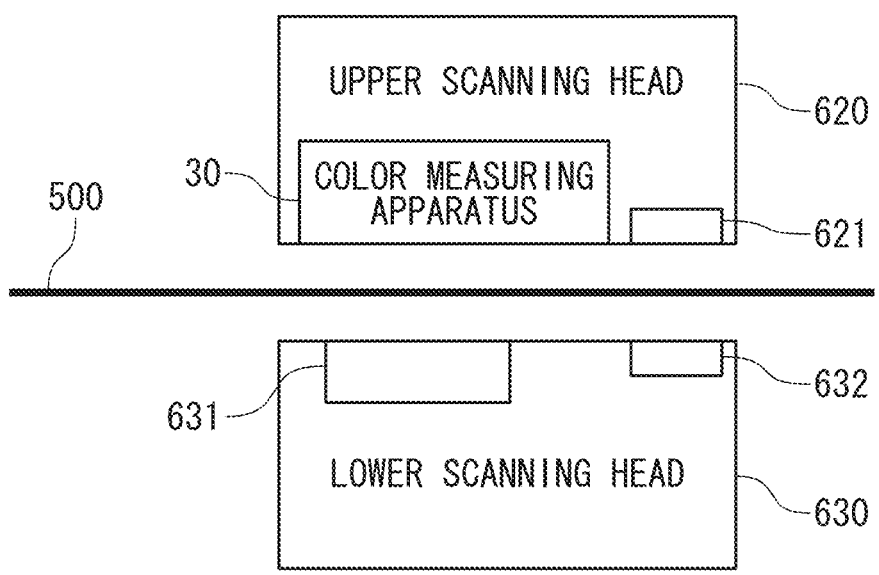
FIG. 14 is a diagram showing an upper scanning head in which the color measuring apparatus and a coil are mounted, and a lower scanning head in which a air bearings and a soft magnetic substance are mounted.

In addition, the color measuring apparatus 20 to which the displacement sensor using the spectroscope 300 is applied can be mounted in an upper side scanning head 620 shown in FIG. 12 to thereby construct a planar measured object quality monitoring apparatus.

Figure 10:
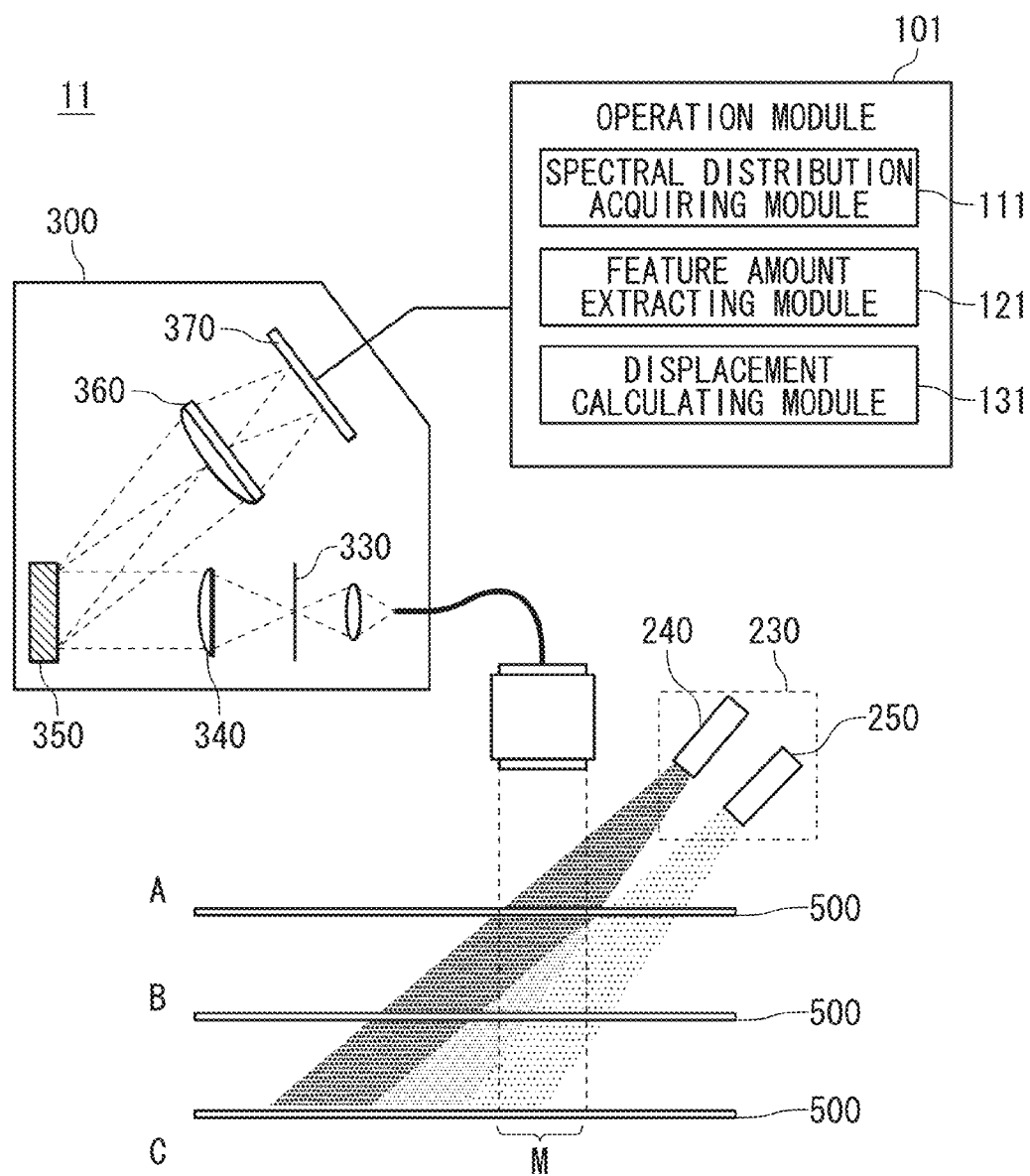
FIG. 10 is a diagram describing a displacement sensor using a spectroscope according to a third exemplary embodiment of the invention.

Next, a modified example of the displacement sensor using the spectroscope 300 will be described. FIG. 10 is a diagram describing a displacement sensor using the spectroscope 300 according to a third embodiment. Description of the portion common to the embodiment described above is simplified.

As shown in FIG. 10, a displacement sensor 11 is an apparatus for measuring displacement of a measured object using a spectroscope, and includes an operation module 101, a light source unit 230 and a spectroscope 300. The spectroscope 300 has a configuration similar to the related-art spectroscope.

The light source unit 230 includes a light source 240 and a light source 250 with different wavelengths and optical axes, and is installed so that emitted light of each of the light sources is obliquely applied to a surface including a measurement region M of paper 500 from different positions. In the second embodiment, the light source 240 emits light of 820 nm and the light source 250 emits light of 880 nm.

As shown in FIG. 10, lights emitted from the two light sources of the light source unit 230 are obliquely applied to the surface including the measurement region M of the paper 500, so that spectral distribution of light reflected by the measurement region M changes according to displacement of the paper 500.

Figure 11:
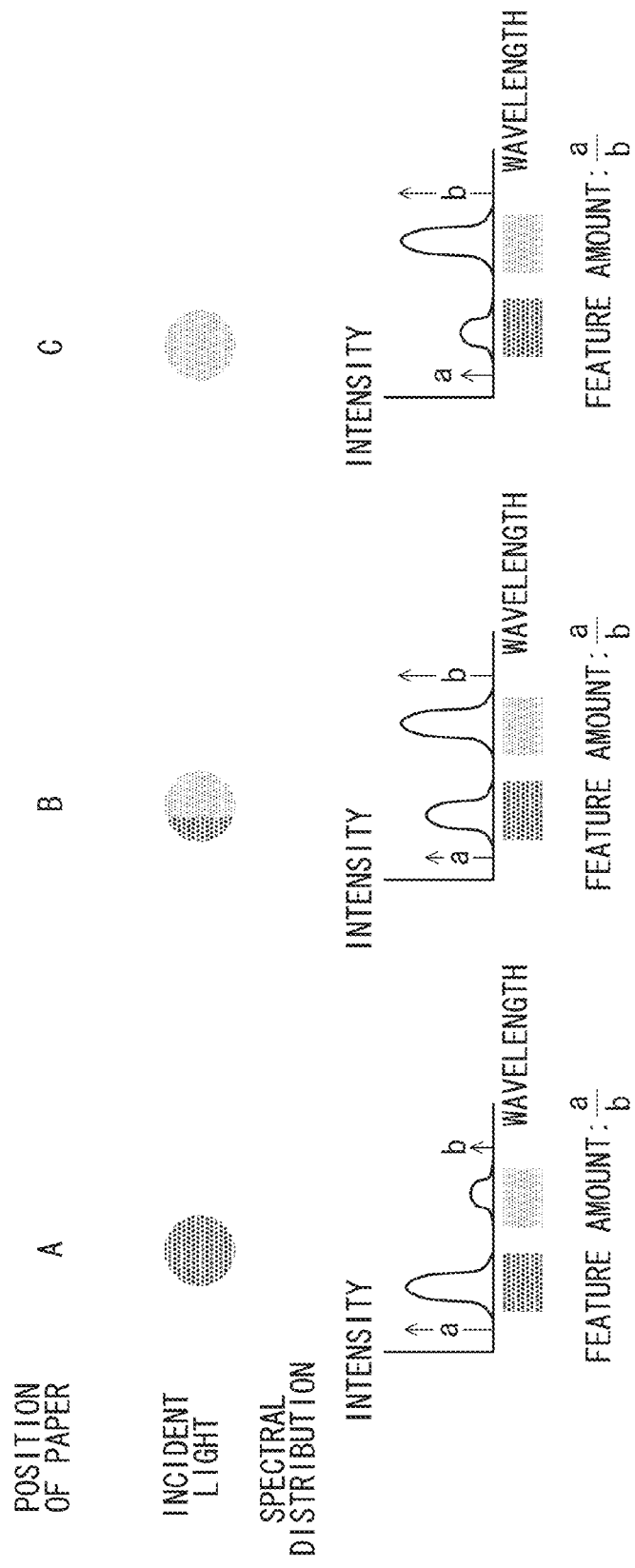
FIG. 11 is a diagram describing spectral distribution and feature amount with respect to the respective displacements.

For example, in a position A near to the light source unit 230, spectral distribution having high intensity a of a wavelength of the light source 240 is obtained as shown in FIG. 11. As a distance from the light source unit 230 is longer in a position B and a position C, spectral distribution having high intensity b of a wavelength of the light source 250 is obtained.

Since a ratio a/b between intensity of the wavelength of the light source 240 and intensity of the wavelength of the light source 250 corresponds to displacement, when a relation between the displacement and the ratio a/b between intensity of the wavelength of the light source 240 and intensity of the wavelength of the light source 250 is previously associated, the spectroscope 300 can measure spectral distribution of the measurement region M to measure displacement of the paper 500 based on the ratio a/b between intensity of the wavelength of the light source 240 and intensity of the wavelength of the light source 250 of the spectral distribution obtained.

In order to perform this processing, the operation module 101 includes a spectral distribution acquiring module 111, a feature amount extracting module 121 and a displacement calculating module 131. The spectral distribution acquiring module 111 acquires spectral distribution of the measurement region M measured by the spectroscope 300.

The feature amount extracting module 121 acquires a feature amount from the acquired spectral distribution. In the third embodiment, the ratio a/b between intensity a of the wavelength of the light source 240 and intensity b of the wavelength of the light source 250 is used as the feature amount.

A correspondence relation between displacement and a feature amount acquired previously is stored in the displacement calculating module 131. The correspondence relation may use a function form or a table form. Based on this correspondence relation, displacement of the measurement region M can be calculated from the feature amount extracted by the feature amount extracting module 121.

Also, according to the third embodiment as described above, the displacement sensor 11 can be constructed using the spectroscope 300. A color measuring apparatus can naturally be constructed using this displacement sensor 11, and this color measuring apparatus can also be applied to a planar measured object quality monitoring apparatus.

What is claimed is:

1. A spectral characteristic measuring apparatus comprising:
    a first light source unit configured to apply first light for spectral characteristic measurement to a measurement region of a planar measured object;
    a second light source unit configured to apply second light for displacement measurement from a reference point of the planar measured object, in a direction oblique to a surface including the measurement region, the second light having a wavelength range that does not overlap with a wavelength range of the first light;
    a spectroscope configured to measure a first spectral distribution of first light applied from the first light source unit and then reflected by the measurement region and a second spectral distribution of second light applied from the second light source unit and then reflected by the measurement region;
    a feature amount extractor configured to extract a feature amount of the second spectral distribution of the second light related to the second light source unit;
    a spectral characteristic calculator configured to calculate spectral characteristics based on the first spectral distribution of the first light related to the first light source unit; and
    a spectral characteristic corrector configured to correct the spectral characteristics based on the extracted feature amount and a relation between spectral characteristics and a feature amount acquired previously,
    wherein the second light source unit includes a light source configured to emit light with a wavelength of a predetermined range, and an optical element in which a transmission wavelength or a reflection wavelength changes according to an incidence angle or an incidence position,
    wherein the second light is light whose wavelength changes according to an emission direction, which is generated by applying the light from the light source to the optical element obliquely at an angle where an optical axis of the light source is constant,
    wherein a wavelength distribution is generated on the surface including the measurement region by the second light so that the light reflected from the measurement region is changed according to the displacement of the planar measured object, and
    wherein the feature amount is a peak wavelength or a peak frequency of the second spectral distribution.

2. The spectral characteristic measuring apparatus as claimed in claim 1, wherein the second light source unit includes a plurality of light sources with different wavelengths.

3. A color measuring apparatus comprising:
    a spectral characteristic measuring apparatus as claimed in claim 1 in which the spectral characteristic is spectral reflectance; and
    a color operator configured to measure a color of the measurement region based on the corrected spectral reflectance.

4. The color measuring apparatus as claimed in claim 3, wherein the second light source unit applies the light, whose wavelength changes according to an emission direction, in the direction oblique to the measurement region.

5. The color measuring apparatus as claimed in claim 3, wherein the second light source unit includes a plurality light sources with different wavelengths.

6. A planar measured object quality monitoring apparatus, comprising:
    a scanning head; and
    a color measuring apparatus as claimed in claim 3 mounted in the scanning head.

7. A spectral characteristic measuring method comprising:
    applying first light, by a first light source unit, for spectral characteristic measurement to a measurement region of a planar measured object;
    measuring spectral characteristics based on spectral distribution of the first light reflected by the measurement region;
    applying second light, by a second light source unit, for displacement measurement from a reference point of the planar measured object in a direction oblique to a surface including the measurement region, the second light having a wavelength range that does not overlap with a wavelength range of the first light source unit;
    extracting a feature amount of spectral distribution of the second light reflected by the measurement region; and correcting the measured spectral characteristics based on the extracted feature amount and a relation between spectral characteristics and a feature amount acquired previously, wherein the second light source unit includes a light source configured to emit light with a wavelength of a predetermined range, and an optical element in which a transmission wavelength or a reflection wavelength changes according to an incidence angle or an incidence position, wherein the second light is light whose wavelength changes according to an emission direction, which is generated by applying the light from the light source to the optical element obliquely at an angle where an optical axis of the light source is constant, wherein a wavelength distribution is generated on the surface including the measurement region by the second light so that the light reflected from the measurement region is changed according to the displacement of the planar measured object, and wherein the feature amount is a peak wavelength or a peak frequency of the second spectral distribution.

8. A color measuring method comprising:

applying first light, by a first light source unit, for spectral characteristic measurement to a measurement region of a planar measured object;

calculating spectral reflectance based on spectral distribution of the first light reflected by the measurement region;

applying second light, by a second light source unit, for displacement measurement from a reference point of the planar measured object, in a direction oblique to a surface including the measurement region, the second light having a wavelength range that does not overlap with a wavelength range of the first light source unit;

extracting a feature amount of spectral distribution of the second light reflected by the measurement region;

correcting the calculated spectral reflectance based on the extracted feature amount and a relation between spectral reflectance and a feature amount acquired previously; and measuring a color of the measurement region based on the corrected spectral reflectance, wherein the second light source unit includes a light source configured to emit light with a wavelength of a predetermined range, and an optical element in which a transmission wavelength or a reflection wavelength changes according to an incidence angle or an incidence position, wherein the second light is light whose wavelength changes according to an emission direction, which is generated by applying the light from the light source to the optical element obliquely at an angle where an optical axis of the light source is constant, wherein a wavelength distribution is generated on the surface including the measurement region by the second light so that the light reflected from the measurement region is changed according to the displacement of the planar measured object, and wherein the feature amount is a peak wavelength or a peak frequency of the second spectral distribution.

9. The spectral characteristic measuring apparatus as claimed in claim 1, wherein the optical element is an optical filter using a dielectric multilayer film.

* * * * *